US008159503B2

(12) United States Patent
Park

(10) Patent No.: US 8,159,503 B2
(45) Date of Patent: Apr. 17, 2012

(54) METHOD FOR ADJUSTING BRIGHTNESS, CONTRAST AND COLOR IN A DISPLAYING APPARATUS

(75) Inventor: Dong S. Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 389 days.

(21) Appl. No.: 10/138,488

(22) Filed: May 6, 2002

(65) Prior Publication Data

US 2002/0163527 A1    Nov. 7, 2002

Related U.S. Application Data

(60) Provisional application No. 60/288,443, filed on May 4, 2001.

(51) Int. Cl.
*G09G 5/00* (2006.01)
*G09G 5/02* (2006.01)

(52) U.S. Cl. ........................................ 345/617; 345/589

(58) Field of Classification Search .................. 345/428, 345/589, 591, 593, 594, 617
See application file for complete search history.

(56) References Cited

U.S. PATENT DOCUMENTS

| 5,247,358 | A | | 9/1993 | Richards |
| 5,298,993 | A | | 3/1994 | Edgar et al. |
| 5,483,259 | A | | 1/1996 | Sachs |
| 5,561,459 | A | * | 10/1996 | Stokes et al. ................. 348/180 |
| 5,638,117 | A | * | 6/1997 | Engeldrum et al. .......... 348/179 |
| 5,739,809 | A | | 4/1998 | McLaughlin et al. |
| 5,898,436 | A | | 4/1999 | Stewart et al. |
| 5,933,130 | A | | 8/1999 | Wagner |
| 6,008,836 | A | | 12/1999 | Bruck et al. |
| 6,008,907 | A | | 12/1999 | Vigneau et al. |
| 6,084,564 | A | | 7/2000 | Ohara et al. |
| 6,498,592 | B1 | * | 12/2002 | Matthies ......................... 345/1.1 |
| 6,686,953 | B1 | * | 2/2004 | Holmes ......................... 348/179 |
| 7,027,067 | B1 | * | 4/2006 | Ohga ............................. 345/589 |
| 2002/0021278 | A1 | * | 2/2002 | Hinckley et al. .............. 345/156 |

FOREIGN PATENT DOCUMENTS

| JP | 08-194452 | * | 7/1996 |
| JP | 08-251498 | | 9/1996 |
| JP | 11-317889 | | 11/1999 |

OTHER PUBLICATIONS

Koren, Norman. "Making Fine Prints in Your Digital Darkroom—Monitor Calibration and Gamma". Accessed on Mar. 25, 2010. Available at http://www.normankoren.com/makingfineprints1A.html.*
"Monitor Calibration and Profiling". Dry Creek Photo. Accessed on Mar. 25, 2010. Available at http://www.drycreekphoto.com/Learn/monitor_calibration.htm.*

* cited by examiner

*Primary Examiner* — Aaron M Richer
(74) *Attorney, Agent, or Firm* — Stanzione & Kim, LLP

(57) ABSTRACT

A process that enables the user to select the type of display device to be adjusted. The user adjusts the brightness levels and color levels of the monitor to create a monitor profile for storage. The user then calibrates the selected monitor relative to a peripheral device such as a color printer device by comparing a printed test image to a displayed a gray scale image and a plurality of color images to establish a printer profile. The user then chooses to print an image by incorporating the printer profile or not.

6 Claims, 13 Drawing Sheets

METHOD FOR ADJUSTING BRIGHTNESS, CONTRAST AND COLOR IN A DISPLAYING APPARATUS

CLAIM OF PRIORITY

Priority is claimed based on a prior provisional application entitled Method And Apparatus Of Adjusting Brightness Of A Display Monitor filed on May 4, 2001 and assigned application Ser. No. 60/288,443. A portion of the disclosure of this patent application contains material which subject to copyright protection. The copyright owner has no objection to the facsimile reproduction by anyone of the patent document or the patent disclosure, as it appears in the United State Patent and Trademark Office prosecution history or records, but otherwise reserves all copyrights whatsoever.

BACKGROUND OF THE INVENTION

1. Field of the Invention

The present invention relates in general to displaying apparatuses, and in more particular, to a displaying apparatus capable of adjusting brightness, contrast and colors of images appearing on the screen of the displaying apparatus so as to be identical absolute colors thereof.

2. Description of the Related Art

Generally, a displaying apparatus receives synchronous signals and red, green and blue (RGB) color signals supplied from a video card installed on a computer main body and displays them in the form of images on the screen thereof. The displaying apparatus includes a cathode ray tube (CRT) monitor employing vacuum tubes or a liquid crystal display (LCD) monitor, and so on.

If an electron beam is emitted within the CRT monitor, the electron beam is bent by horizontal and vertical deflecting coils to strike a point on the screen. The inner surface of the screen is coated with phosphor, which emits lights if the beam is received therein. Since the electron beam continuously strikes each point on the screen, lights are emitted depending upon contact of the beam with the respective points, thereby displaying images on the screen.

The LCD monitor uses a property that if a voltage is applied to a liquid crystal layer stored in a space between two thin glass plates through a transparent electrode, a direction of orientation of the molecules of the liquid crystal is changed, and then the rate of light passing through the liquid crystal layer is changed. Usually, the liquid crystal in itself does not emit lights. A portion of the liquid crystal, to which a voltage is applied when lights are reflected by a reflecting plate in the backside thereof, becomes opaque, thereby making it unavailable for reflecting images. Because of this, the images are differentiated in brightness. The colors displayed on the screen of a display device often vary not only between different models of display devices, but also between different display devices of the same model. Efforts have been made in the art to calibrate individual display device in an effort to obtain uniformity between their colors. Frequently the black point is obtained by adjusting the whiteness in contrast of the monitor relative to an external, hand-held color card containing a black image. The color card must be present and used for each adjusting of the display device. Efforts such as the Interactive Method And System For Color Characterization And Calibration Of Display Device by Peter Engeldrum et al., U.S. Pat. No. 5,638,117, is an exemplar of the adjustment of the color in a central portion relative to a peripheral area by using a visual comparison between one or more matching cards viewed in juxtaposition to an image displayed on the screen of the display device.

The Method And Apparatus For Adjusting Television Display Control Using A Browser by T. A. Bruck, et al., U.S. Pat. No. 6,008,836, relies upon the user's adjustment of brightness in an effort to render an image within a colored box projected upon the screen, barely visible. This algorithm for executing this technique must be downloaded via WEB-TV from a web server.

The Color Calibration Of Display Device by J. M. Sach, U.S. Pat. No. 5,483,259, relies upon adjustment of the brightness control until a black area and an adjacent dark gray area become indistinguishable.

Japanese patent publication No. Heisei 08-194452, assigned to Canon, requires a user to adjust the color of the central portion of the screen to match peripheral patterns by using a keyboard, but lacks adjustment to obtain calibration of black points and white points.

The Display Calibration of A. D. Edgar, et al., U.S. Pat. No. 5,298,993, relies upon adjustment of the brightness by using a grid pattern, with adjacent patterns controlled to provide a continuous tone.

The Apparatus For Determining A Black Point On A Display Unit And Method Of Performing The Same by K. Ohara et al., U.S. Pat. No. 6,084,564, endeavors to facilitate a determination of a black point by setting a comparison brightness region in order to allow an easy distinction relative to a reference brightness region. A gamma point is controlled by using a standard region and a control region.

The Printer Calibration by Michael J. Vigneau, et al., U.S. Pat. No. 6,008,907, uses a pattern in an effort to adjust the color of the printed image to the display image formed on the screen of the display device.

Despite these efforts in the art, I have encountered significant problems attributable to color mismatch between peripheral devices, for example, monitors, printers, digital cameras, color scanners, and other appliances, and have recognized the need for a color management system that provides accurate and predicable color matching, and is available for use with any type of monitor as well as multi-monitor setups.

SUMMARY OF THE INVENTION

The present invention has been made keeping in mind the above-described shortcoming, and an object of the present invention is to provide a displaying apparatus which can be adjusted so as to allow colors of images displayed on the screen to be consistent with actual colors thereof. "Color", is used in this application in a general sense to mean the hue, saturation and value for light sources, or hue, shade and value for objects. The term may also be used to compensate black, white or grayscale.

This and other objects of the present invention may be achieved by providing a method for adjusting a color of an image displayed on a displaying apparatus having a screen on which an image is displayed, comprising the steps of displaying the image on the screen; providing a non-active area so as to be adjacent to the image within the screen; and adjusting the brightness of the image to be matched with that of the non-active area.

Preferably, the method further comprises the step of reducing the size of the image to a predetermined size in the screen.

Preferably, the method further comprises the step of setting up the brightness and contrast of the image to the maximum value before the step of adjusting the brightness.

Preferably, the image includes a black color area inside thereof.

Preferably, the method further comprises the step of setting up a black point of a gamma property curve when the brightness of the black color area within the image matches with the brightness of the non-active area.

Preferably, the method further comprises the step of setting up a white point of the gamma property curve based on the black point and the maximum value of the brightness.

Preferably, the method further comprises the step of presenting a light condition setting window for selecting a light type of neighboring environment.

Preferably, the method further comprises the step of presenting a color adjust selecting window relative to each of R, G, B colors of the image.

Preferably, the method further comprises the steps of selecting at least one of the R, G, B colors in the color adjust selecting window; and adjusting the selected color so as to be matched with a reference color based on the black point and the white point.

Preferably, the method further comprises the steps of displaying a predetermined image having a reference contrast on the screen; and matching the contrast of the image with the reference contrast.

Preferably, the method further comprises the step of providing the non-active area so as to be adjacent to the predetermined image in the screen.

Preferably, the method further comprises the step of matching the contrast of the non-active area with the reference contrast.

Preferably, the method further comprises the step of setting up the contrast to the minimum value before the step of matching the contrast.

Preferably, the method further comprises the step of setting up a white point of a gamma property curve when the contrast of the non-active area is matched with the reference contrast.

Preferably, the method further comprises the step of setting up a black point of the gamma property curve through the white point and the minimum value of the contrast.

Preferably, the method further comprises the step of generating and storing a color profile including the white point, the lighting conditions and at least one of the adjusted colors.

According to another embodiment of the present invention, this and other objects may also been accomplished by providing an output color adjusting method of a displaying apparatus, comprising the steps of outputting a sample image to a printing device; presenting a reference color image based on a predetermined black point and white point; and adjusting the color so as to allow the color of the sample image to be matched with the reference color image.

Preferably, the reference color image includes reference color images relative to each color of R, G, B, C, M and Y.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 12:
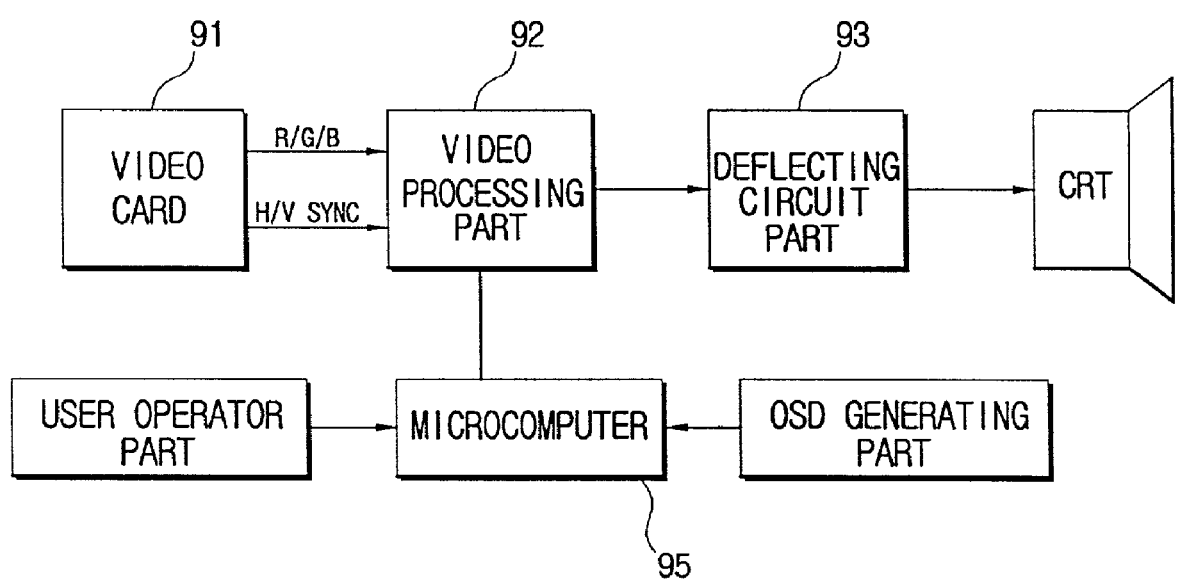
FIG. 12 is a control block diagram of a CRT displaying apparatus.

FIG. 12 shows a control block diagram of a CRT monitor which is comprised of a video card 91 outputting RGB video signals and horizontal and vertical (H/V) synchronous signals, a video signal processing part 92 converting the RGB video signals into digital signals and synchronizing with the H/V synchronous signals, a deflection circuit part 93 deflecting the electron beam and a microcomputer 95 controlling the digitally converted RGB signals to be displayed on the screen according to the synchronous signal. These elements are well known in the art and need not be further explained herein.

Figure 13:
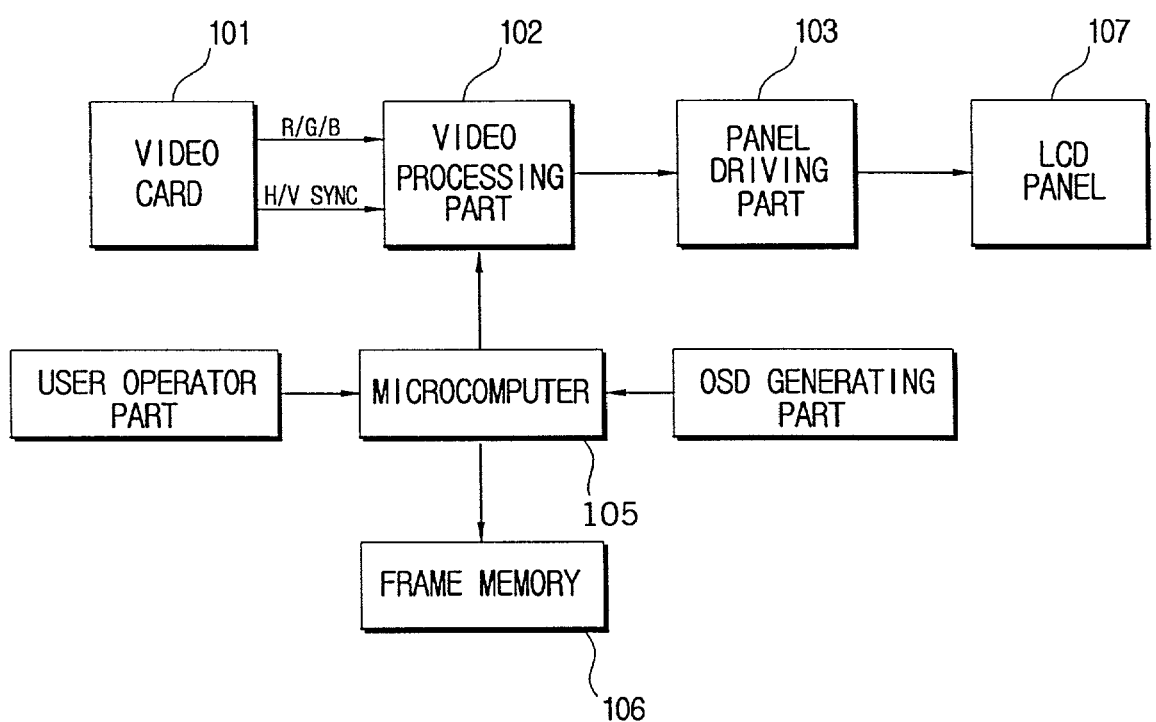
FIG. 13 is a control block diagram of an LCD displaying apparatus.

FIG. 13 shows a control block diagram of an LCD monitor which is comprised of a video card 101, a video processing part 102 converting RGB video signals into digital signals and adjusting the size of the video signals adaptively to comply with H/V synchronous signals, a frame memory 106 temporarily storing therein the video signals processed by the video processing part 102, a panel driving part 103 driving an LCD panel 107 and a microcomputer 105 controlling the video processing part 102 so as to allow the video signals to be converted adaptively for display on the LCD panel 107 based on the synchronous signals. These elements are well known in the art and need not be further explained herein.

However, due to loss of RGB video signals, allowable tolerance of each part and difference in lights-emitting efficiency of displaying devices and so on, colors of images displayed on the screen of the CRT or the LCD become varied depending upon the makers of displaying apparatuses and respective models thereof. This has caused a problem that there exists a difference in colors of images outputted in image-outputting devices such as monitors, printers, digital cameras, colorful scanners, etc.

In digital photographic editing for example, photographs or other images are scanned and digitized, and are then displayed on a computer's monitor. A user may then alter certain attributes of the displayed digital image, and alterations appear on the display screen of the monitor. The altered image may be printed by a color printer on a sheet of paper or other printable media.

Gamma is a measure of the relationship between the brightness of color as it appears on a display screen of the monitor and a signal amplitude used by the monitor to generate that color.

Properties of displaying colors on a CRT monitor are briefly described as follows. Conventionally, it has been known that CRTs have a non-linear display characteristic on input value X applied to a display driver vs. relative brightness Yd. A transit input value X, leaving the zero level of the relative brightness, is called "Black Point" (BP). As is well known in the art, by representing the minimum level of each of the input value X, the relative brightness Yd with a digital number 0 (zero), and the maximum level thereof with a digital number 255, the display characteristic of the CRT can be approximated with the following exponential functions:

When $X<BP$, then $Yd=0$.

When $X>BP$, then $Yd=\{(X-BP)/(255-BP)\}^{\gamma} \times 255$, where γ is a predetermined constant specific to the CRT display but is changeable due to, for example, aging of the CRT display.

The black point BP can be changed by a brightness adjusting mechanism provided in the display. The black point also changes due to aging of the display and is seen to be different in level depending on the perception of individuals watching the display. Therefore, it becomes possible to set up a correct level of the black point by matching the input value with the color actually recognized.

Figure 1:
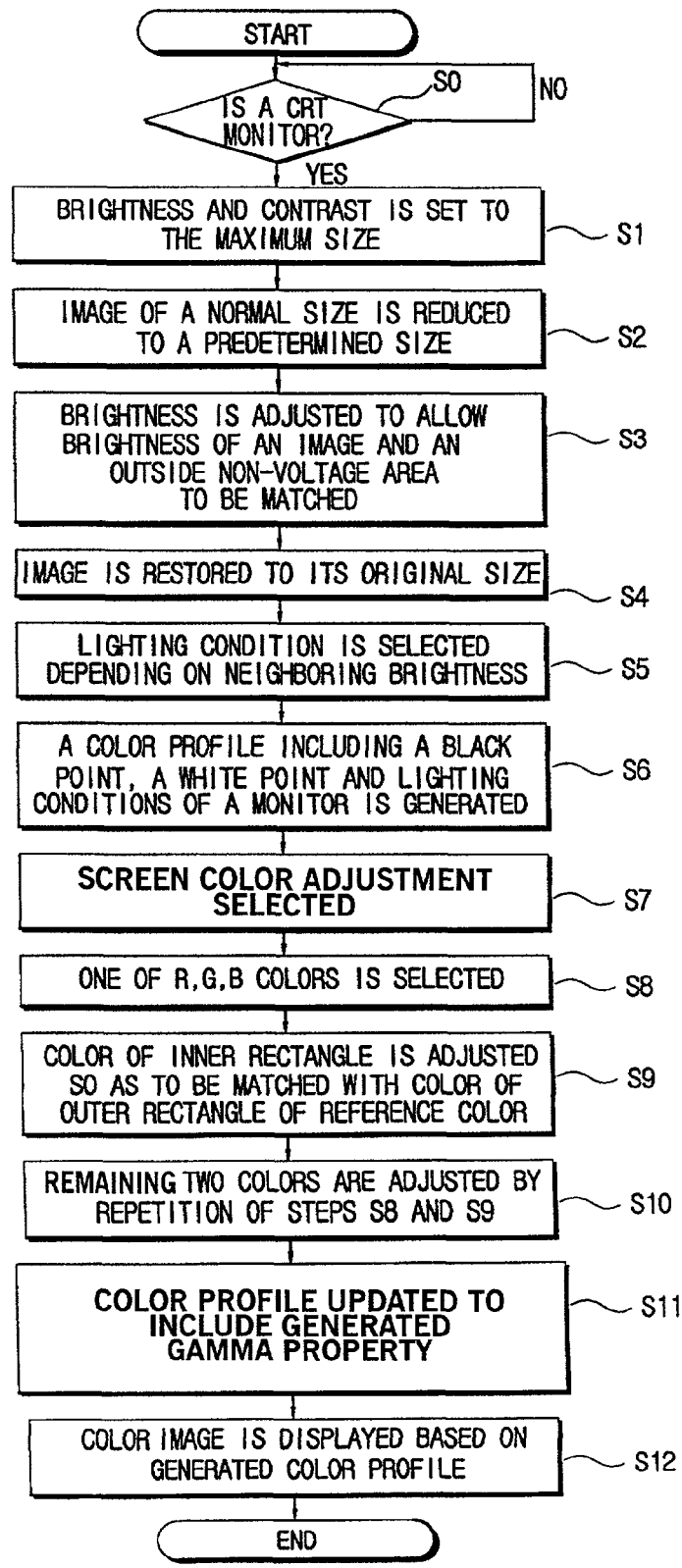
FIG. 1 is a flow chart showing a color-adjusting method for a CRT monitor according to the present invention.

FIG. 1 is a flow chart showing a color-adjusting method for the CRT monitor according to the present invention. Referring to this figure, the present invention will be described with focusing on an execution sequence of a color adjusting program realized as a software based on the color-adjusting method according to the present invention.

As illustrated in FIG. 1, when it is determined that the monitor is a CRT monitor at S0, a predetermined image (see FIG. 5) is first displayed (active area of the screen) and brightness and contrast of the image are set up to the maximum value by use of a bright adjusting button and a contrast button on the CRT monitor at S1. Four corners of the image are respectively formed with an outline to indicate the size of the image, and a color of the inside image area is set to black. Next, the image is reduced to a predetermined size at S2. As the image is reduced, the reduced image is displayed in the center of the screen. Reduction can be made to an arbitrary fraction of its normal screen size, to perhaps forty (40%), fifty (50%) percent or approximately sixty (60%) percent.

The remaining area surrounding the reduced image constitutes a non-active area and is indicated in black (see FIG. 5), and the black area within the reduced image is indicated lighter than the non-active area (that is, a black raster area of the CRT), creating a difference in brightness. Therefore, in order to match the brightness of the black area within the reduced image to the brightness of the non-active area on the outer circumference of the reduced image, a user operator part is adjusted so as to make the color values appear identical by reducing the brightness of the reduced image at S3. The black point of the monitor is set up by adjusting the brightness of the monitor, and the white point of the monitor can be obtained by adjusting the contrast value to the maximum value based on the set black point. As a next step, the reduced image is restored to its original size at S4.

Figure 4:
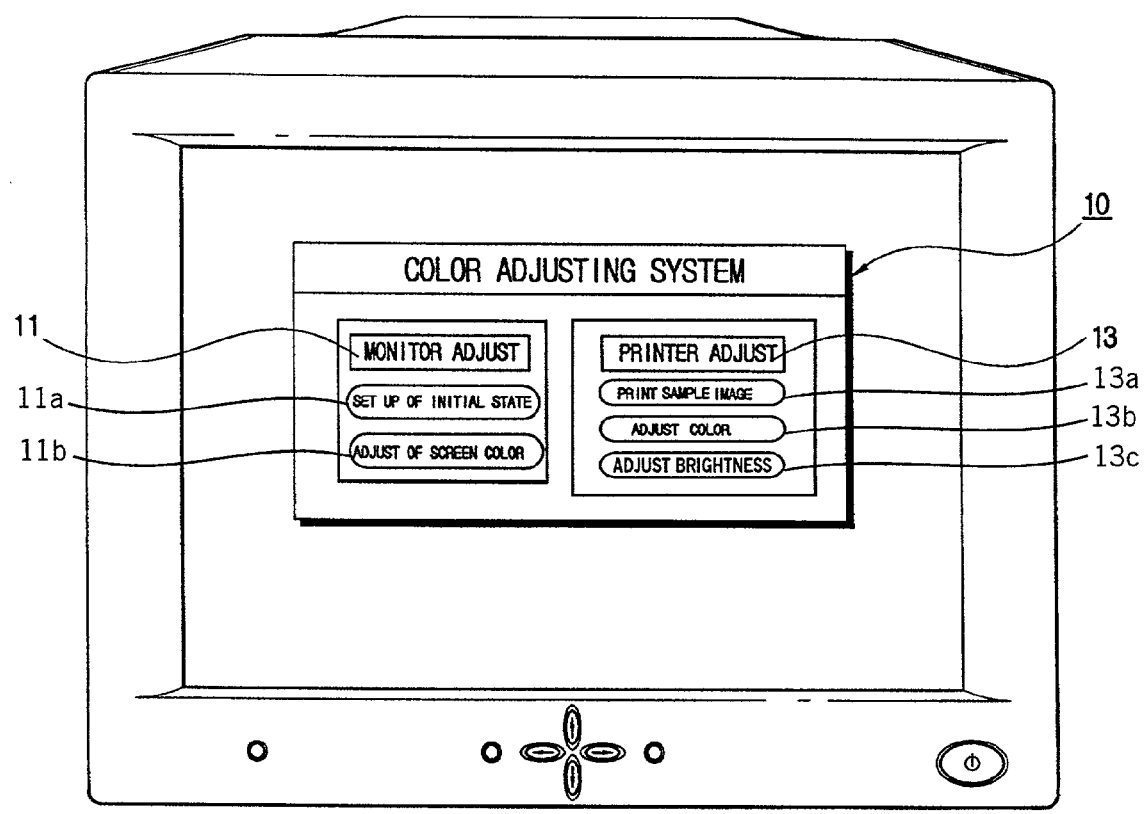
FIG. 4 shows an initial screen according to a color-adjusting program employing the present invention.

Next, at S5 a lighting environment setting is then selected from an initial menu window shown in FIG. 4 and a lighting condition is selected according to the ambient light reference (fluorescent light, incandescent light, or sunlight) of the monitor, to set up the user's environmental lighting condition, and an ICM (image color matching) profile containing the black point, the white point and lighting information is generated and stored in memory at S6.

Thereafter, at S7 a screen color adjustment is selected, as seen in FIG. 4 (to be described later), to adjust the color, and a color adjusting screen is displayed (see FIG. 8) for adjusting a gamma value so as to allow the red, green and blue colors to be matched with actual colors. One of the red, green or blue colors is selected in the color adjusting screen at S8, and color adjusting button (or a scroll bar) is adjusted at S9 so as to match the color of the inner rectangle with the color of an outer rectangle which indicates a color relative to a random reference gamma point in a gamma curve obtained by the black point and the white point. S10 indicates that the other two colors are also adjusted, by repeating steps S8 and S9 for each remaining color.

Once the color adjustment is completed, a property of gamma is added in the above-described ICM profile, thereby generating a new ICM profile at S11 and stored in memory, that is, the ICM profile is updated with the latest information obtained in steps S7-S10. Then a color image is displayed based on the updated ICM profile at S12.

Figure 2:
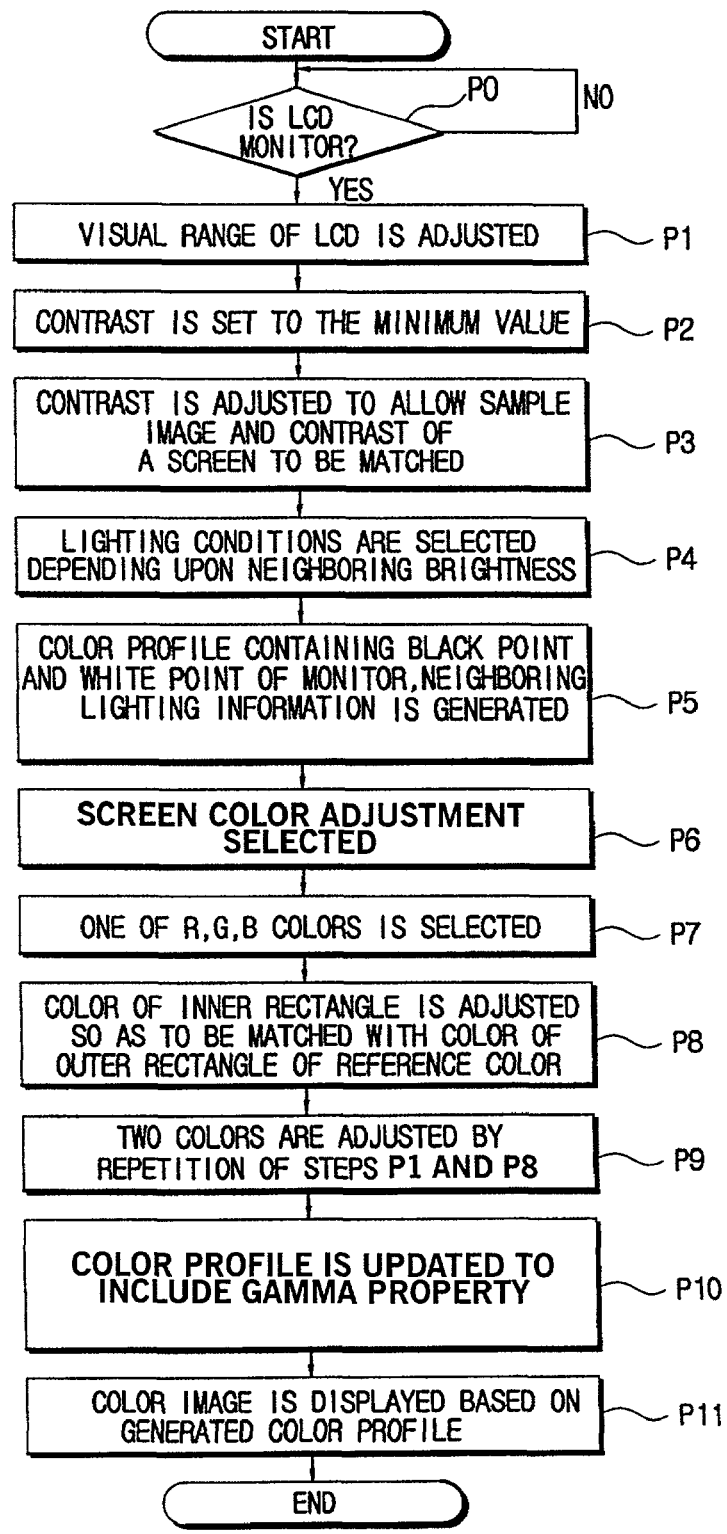
FIG. 2 is a flow chart showing a color-adjusting method for an LCD monitor according to the present invention.

FIG. 2 is a flow chart showing a color-adjusting method for an LCD monitor according to the present invention. As illustrated in FIG. 2, when it is determined that the monitor is an LCD monitor at P0, since a color and a shade of the image on the LCD monitor are seen differently relative to a user's eyes, the main body of the LCD monitor is first adjusted, to thereby adjust a viewing angle of the monitor appropriately and correctly at P1. Next, a contrast is set to a minimum value through a user operator part of the monitor, to thereby set up a white point of the monitor at P2. The contrast is adjusted so as to allow a contrast of a sample image shown in FIG. 6 (to be described later) to be matched with a contrast of the screen at P3. At this time, a black point of the LCD monitor can be obtained by adding the adjusted contrast brightness to the white point.

A lighting environment setting is then selected from an initial menu window shown in FIG. 4, to set up the environmental lighting condition, thereby selecting a lighting condition according to the ambient light reference (fluorescent light, incandescent light, or sunlight) of the monitor at P4, and an ICM profile including the black point, the white point and lighting information is generated at P5 and stored in memory.

As a next step, the screen color adjustment icon is selected in FIG. 4, to adjust a gamma property of a color of the image P6, the color adjusting screen (see FIG. 8) for adjusting so as to allow the colors of red, green and blue to be matched with actual colors, and one of the red, green or blue colors is selected in the color adjusting screen at P7. The color of the inner rectangle is adjusted so as to be matched with the color of the outer rectangle indicated in color based on the random reference gamma point in the gamma curve obtained by the black point and the white point at P8. The remaining two colors are selected and adjusted through repetition of the steps P7 and P8 at P9. When the color adjustment is completed, a new ICM file is generated by adding the property of gamma to the earlier stored ICM file having stored therein the black point, the white point and the lighting conditions at P10. A color image is then displayed on the screen based on the updated ICM profile at P11.

Figure 3:
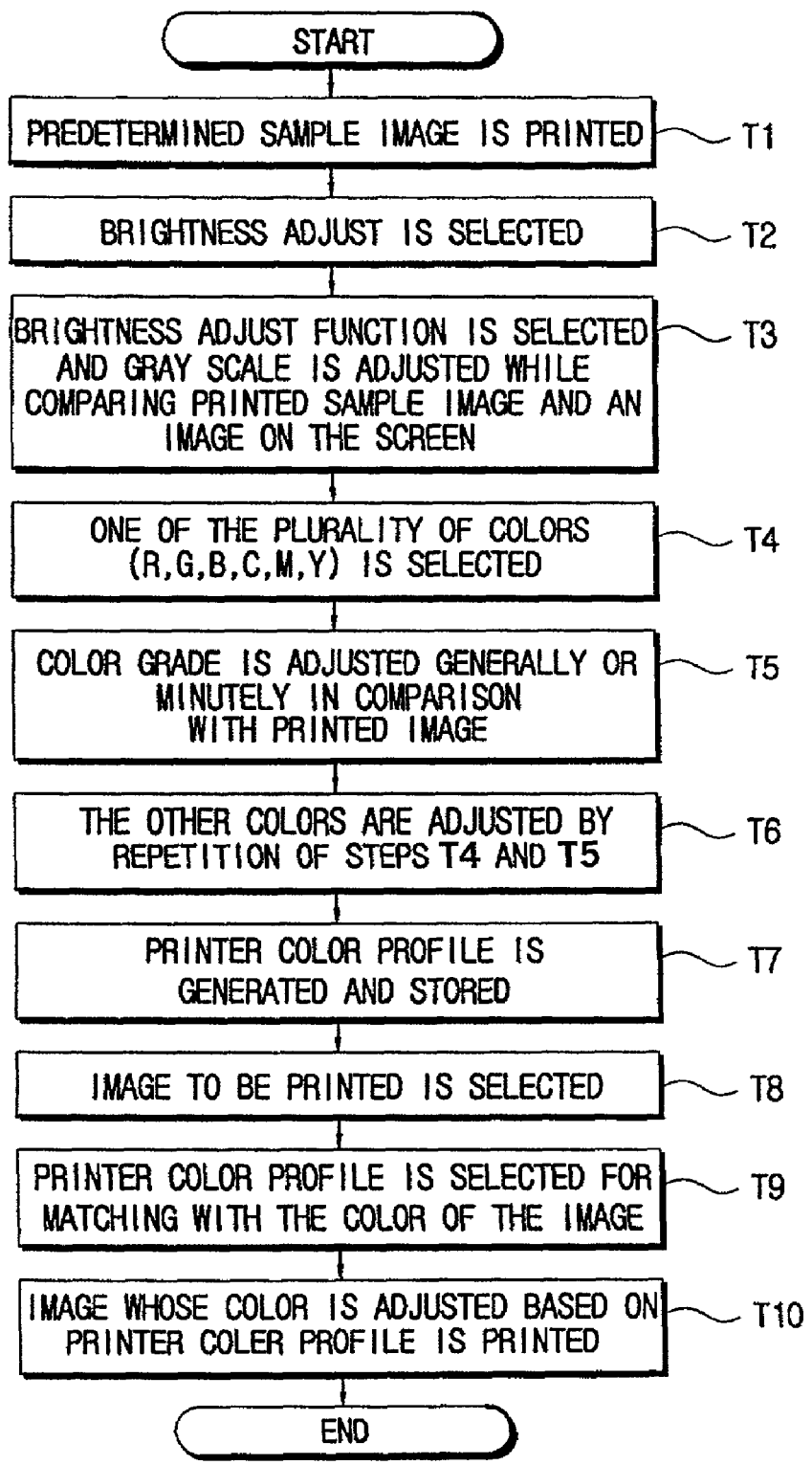
FIG. 3 is a flow chart showing a color-adjusting method in the case of output by a printer according to the present invention.
Figure 9:
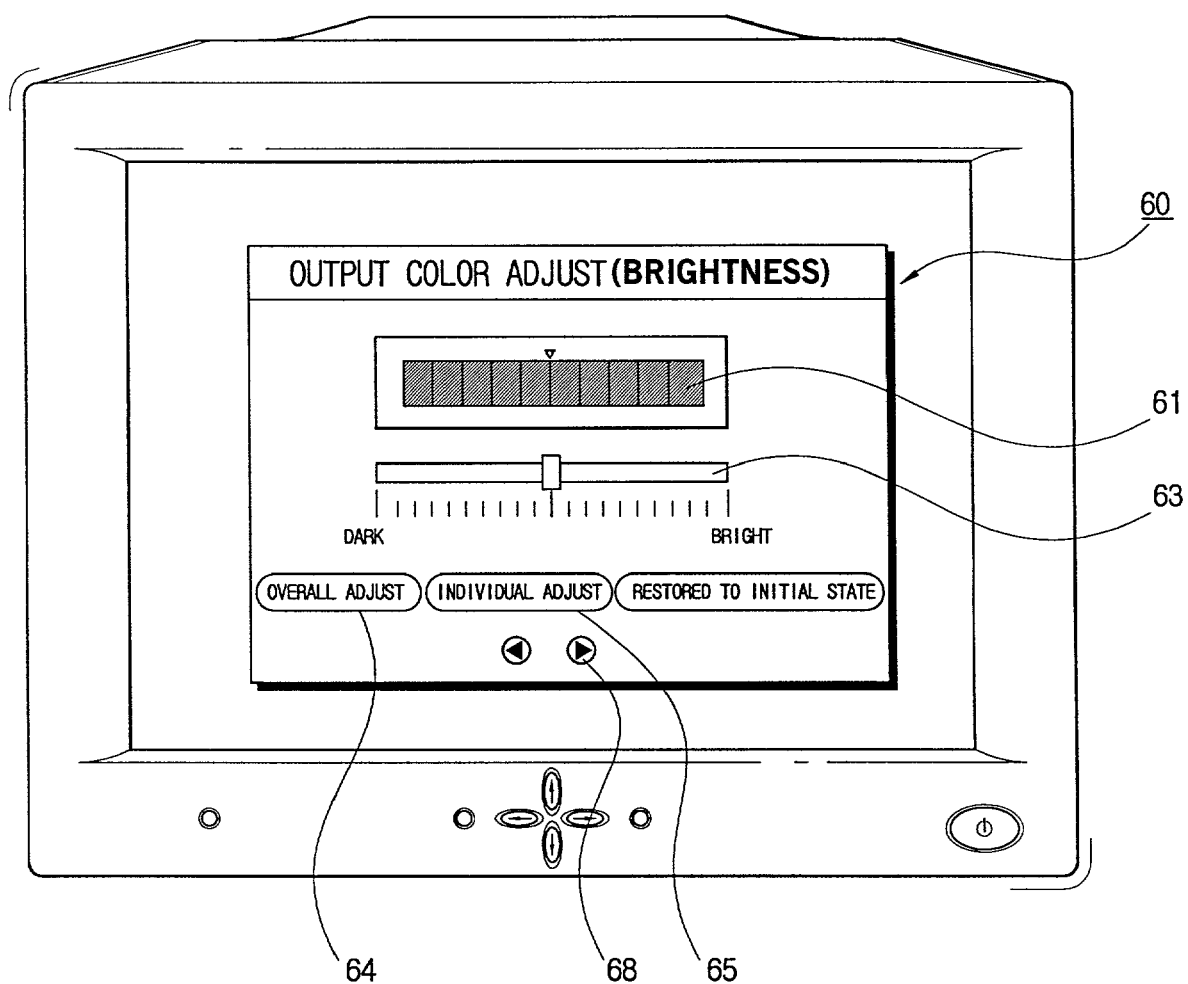
FIG. 9 shows a screen for adjusting brightness of a printer when color adjustment of an output by a printer is selected in FIG. 4.
Figure 10:
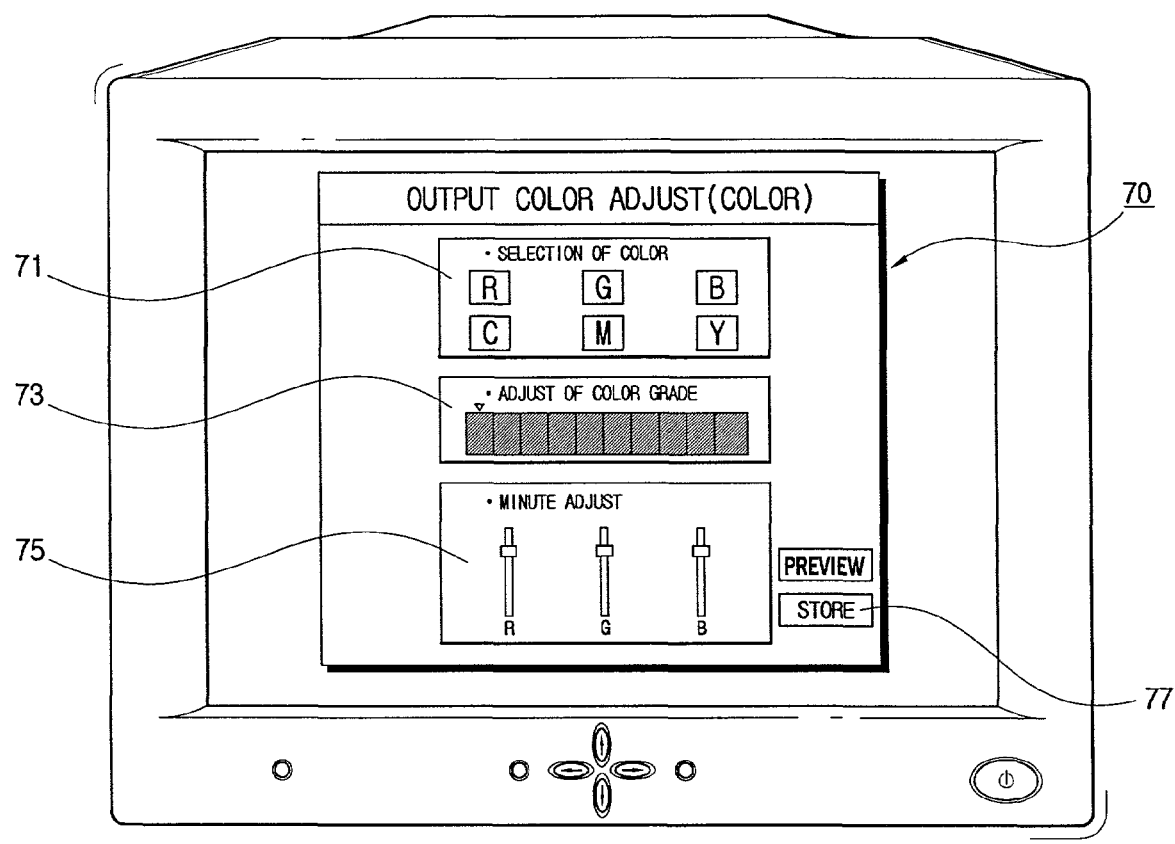
FIG. 10 shows a screen for adjusting colors of a printer when color adjustment of an output by a printer is selected in FIG. 4.
Figure 11:
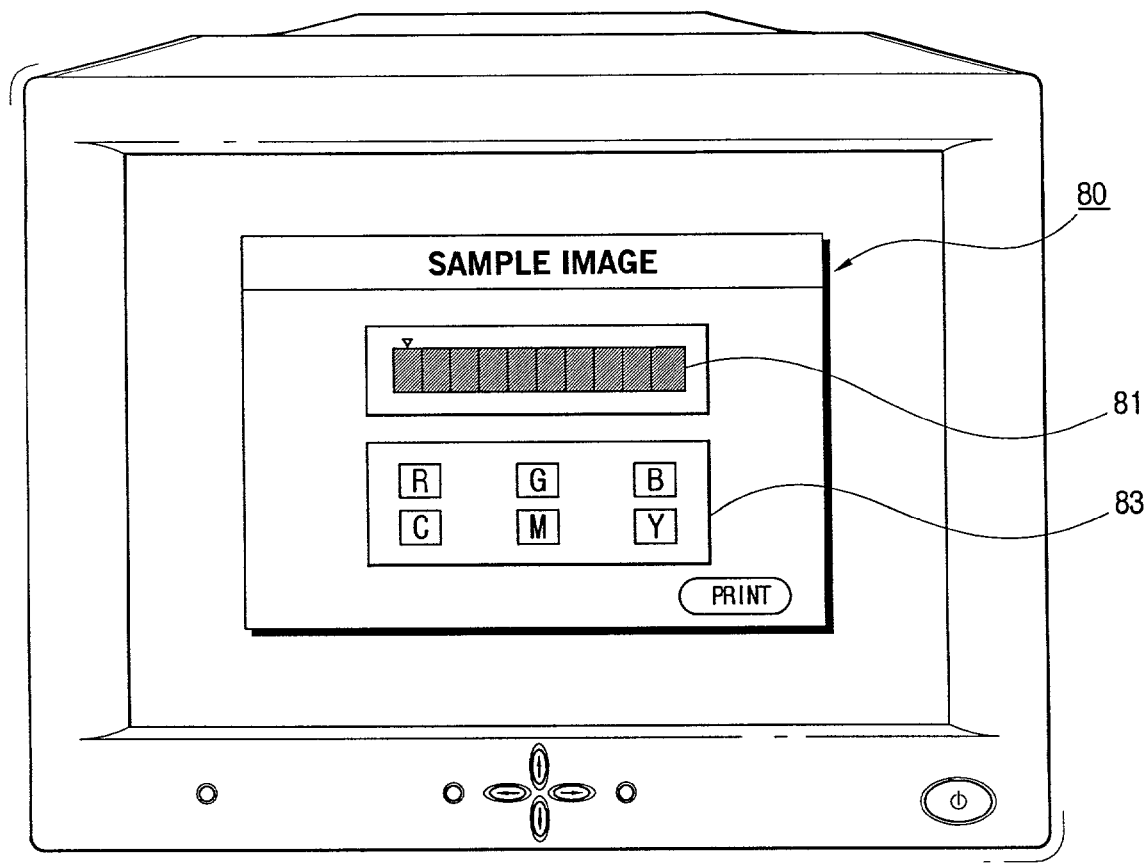
FIG. 11 shows a screen for outputting a sample image when printing of the sample image is selected in FIG. 4.

FIG. 3 is a flow chart generating a color profile for a color image printer according to the present invention. Referring to FIGS. 9 through 11 (to be described later), a method for adjusting a printer color will be applied through the following processes. FIG. 4 shows an adjustment menu for selecting printer adjustment, as will be described later.

As shown in the FIG. 3, at T1 a predetermined sample image (see 80 in FIG. 11) is printed out by a printer. Next, the user must select in FIG. 4 one of a brightness adjustment or color adjustment. In FIG. 3, I show that the user chooses brightness adjustment in step T2, but the order of choice is up to the user.

When the brightness adjustment is chosen at T2, a multi-shaded gray scale image is displayed on the screen. For brightness adjustment, step T3, the user adjusts the gray scale on the screen (FIG. 9, to be described later) of the monitor, while comparing it with the printed sample specimen, using two adjustment control functions of the monitor. One of which is an overall adjustment and the other of which is an individual (fine) adjustment. Overall adjustment is used to modify the brightness of the entire gray scale at one time. Fine adjustment is used to modify the brightness of one particular shade of gray. The user can adjust the full range of brightness through the use of a slider bar displayed on the screen. Step T3 establishes the black and white characteristics of the printer. A test print can then be made to again compare the printed result with the displayed gray scale images.

The user then makes a selection of a color adjustment for adjusting color (FIG. 4). When the color adjustment is chosen, a plurality of color images (Red, Green, Blue, Cyan, Magenta, Yellow) are displayed on the color adjusting window (FIG. 10, to be described later).

When a color adjusting function of a printing image is selected in FIG. 4, one of the plurality of colors (Red, Green, Blue, Cyan, Magenta, Yellow) is selected from the color adjusting window at T4. Overall adjustment or minute adjustment of color grade is performed while comparing the printed sample image to the selected color of the image on the screen at T5. That is, during step T5 the user adjusts the screen color of the selected color image via a horizontal color scale control while comparing the printed sample image to the selected color image. The color of the selected color image can then be further adjusted by fine tuning (minute adjustment) during comparison with the printed sample image by user movement of three (RGB) vertical slider bars until the user perceives the color of the selected color image is identical to the printed sample image. In step T6, the user repeats steps T4 and T5 for each of the remaining five colors.

When adjustment of the color grade is completed, a printer profile is generated and stored at T7. A user then browses for and selects a random image to be printed out at T8. The selected image will be displayed on the screen. Then at T9, the user browses for and selects the printer profile that contains current information about the user's printer, in order to obtain image matching. An image signal whose color signal is adjusted based on the selected printer profile is outputted from the video card, and the image whose color is adjusted by the printer profile is displayed on the screen. At this time a pair of images will also be displayed on the screen. One of these images will lot show what will be a printing result without use of the printer profile and the other will show what will be a printed result using the printer profile. The user can select to print the image without the printer profile or the image with the printer profile. Subsequently, since the purpose of the color adjustment is to obtain an image with the printer profile that has the more accurate representation, in step T10 the user selects to print the image with the printer profile. Steps T2 through T9 may been repeated if the color of the displayed simulated image does not match the printed image which has been generated using the printer profile for the image printed.

Figure 5:
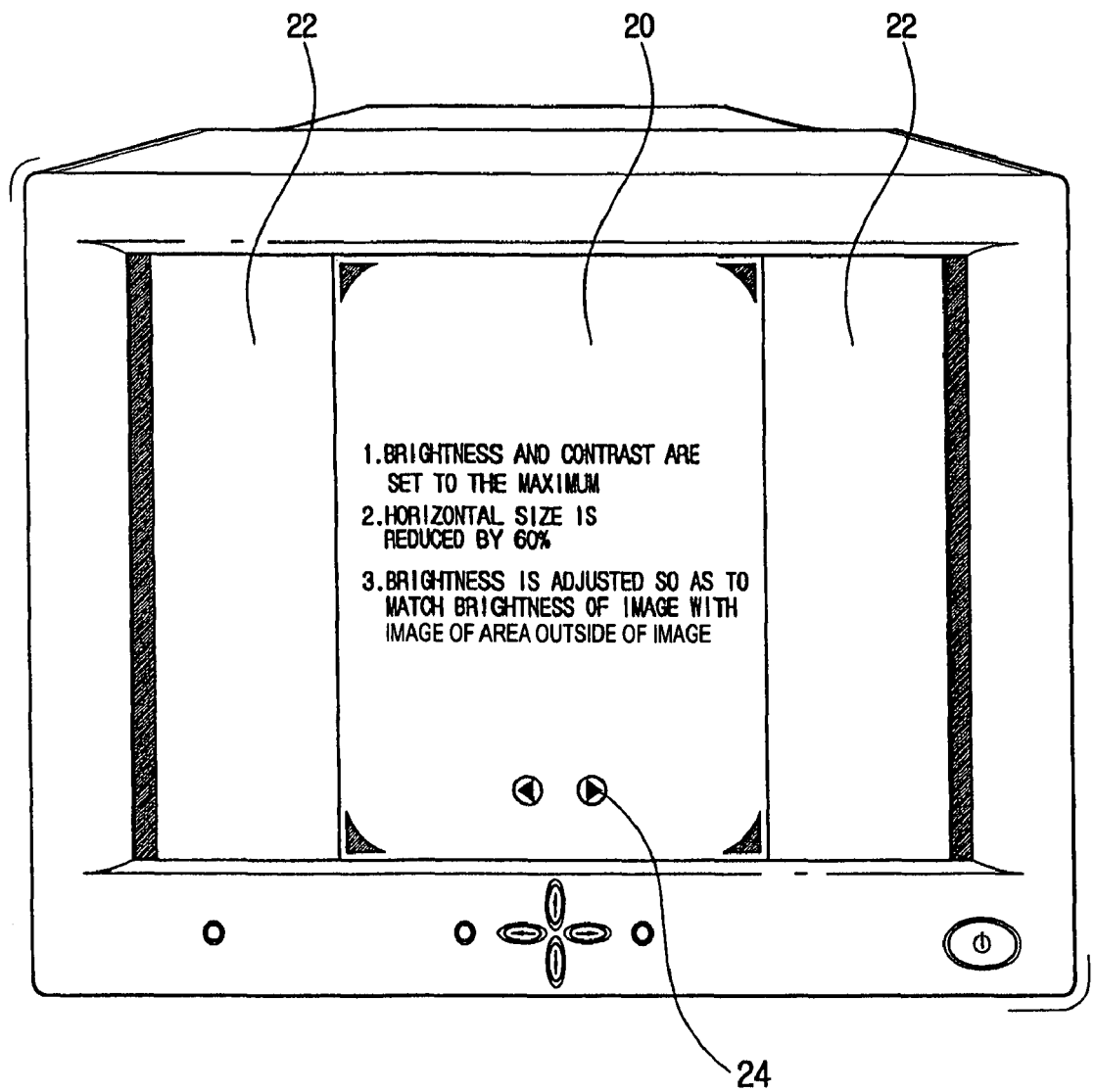
FIG. 5 shows a screen on which brightness of the CRT monitor is set up according to selection of an initial status set-up in FIG. 4.
Figure 6:
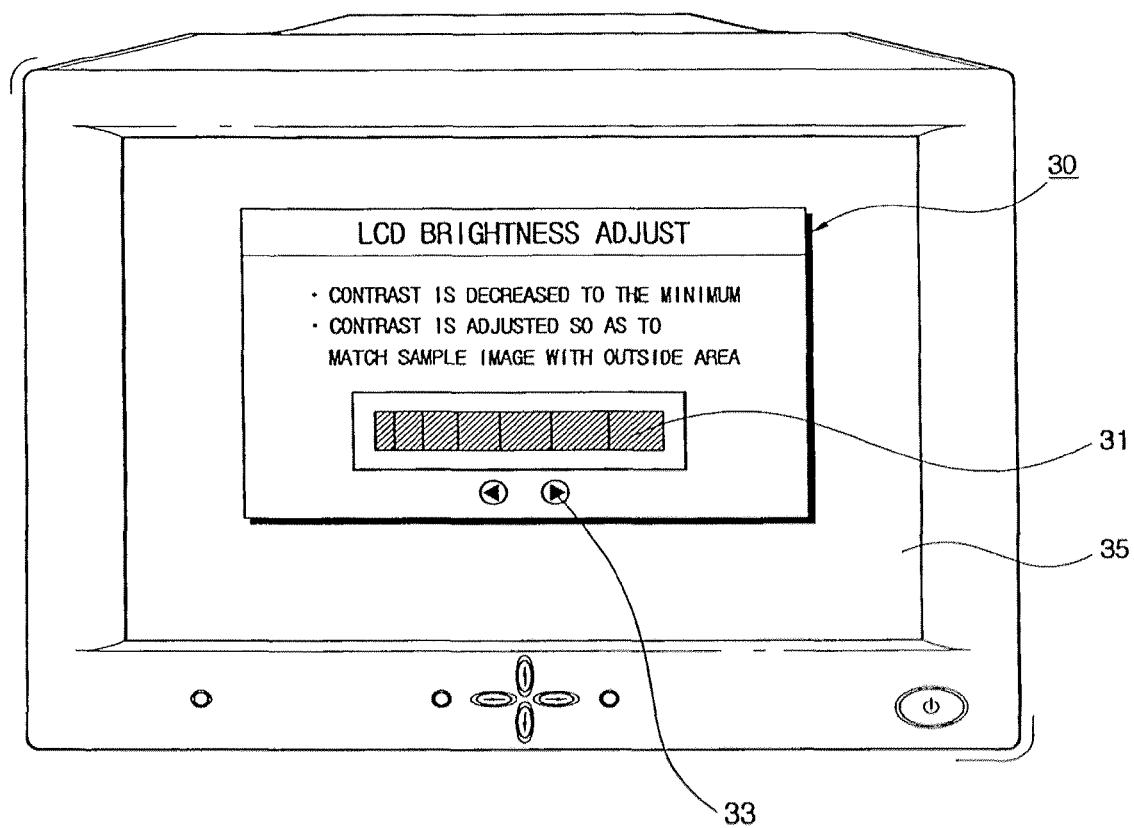
FIG. 6 shows a screen on which brightness of the LCD monitor is set up according to selection of an initial status set-up in FIG. 4.

FIG. 4 shows an initial menu window 10 according to a color-adjusting program employing the present invention, FIG. 5 shows a window 20 on which brightness of the CRT monitor is set up according to selection of an initial status set-up in FIG. 4 when the monitor is a CRT monitor, and FIG. 6 shows a window 30 on which brightness of the LCD monitor is set up according to selection of the initial status set-up in FIG. 4 when the monitor is an LCD monitor.

As illustrated in FIG. 4, the initial menu window 10 of the color-adjusting program is provided with a monitor color-adjusting icon 11 and a printer color-adjusting icon 13. Below the monitor color-adjusting icon 11 are provided an icon 11a for setting up an initial state of the monitor and an icon 11b for adjusting a screen color, as lower menus (sub-menus). Below the printer color-adjusting icon 13 are provided an icon 13a for printing a sample image, an icon 13b for adjusting an output color and an icon 13c for adjusting brightness, as lower menus.

When the initial state setting icon 11a is selected in FIG. 4, a monitor type selecting as window, a brightness adjusting window and a lighting environment setting window are presented in sequence. As settings are completed in each window, the windows are transformed sequentially for the next set up.

If the monitor color adjusting icon 11b is selected from the initial menu window 10, the monitor type selecting window (not shown) is presented in order to select either of a CRT monitor and an LCD monitor. If the CRT monitor is selected from the monitor type selecting window, the brightness adjusting window 20 formed with the outlines is displayed as shown in FIG. 5 in order to indicate a size of the window. Here, if the horizontal size thereof is reduced after setting up brightness and contrast to the maximum values through the user operator part 24, the horizontal value of the brightness adjusting window is reduced, thereby forming the non-active area 22 respectively in right and left sides of the brightness adjusting window 20. At this time, the user sets up the initial state of the monitor by reducing brightness so as to allow the inside area of the brightness adjusting window 20 to be matched the brightness of the non-active area 22.

If the LCD monitor is selected from the monitor type selecting window (not shown), the brightness adjusting window 30 of the LCD monitor is displayed as seen in FIG. 6. The brightness adjusting window 30 of the LCD monitor is, as seen in this figure, comprised of a reference contrast block 31 below it. Under the status that the contrast of the LCD monitor is set up to the minimum using the user operator part 33, the contrast is again adjusted so as to match the contrast of the non-active area 35 of the screen based on the reference block 31.

Figure 7:
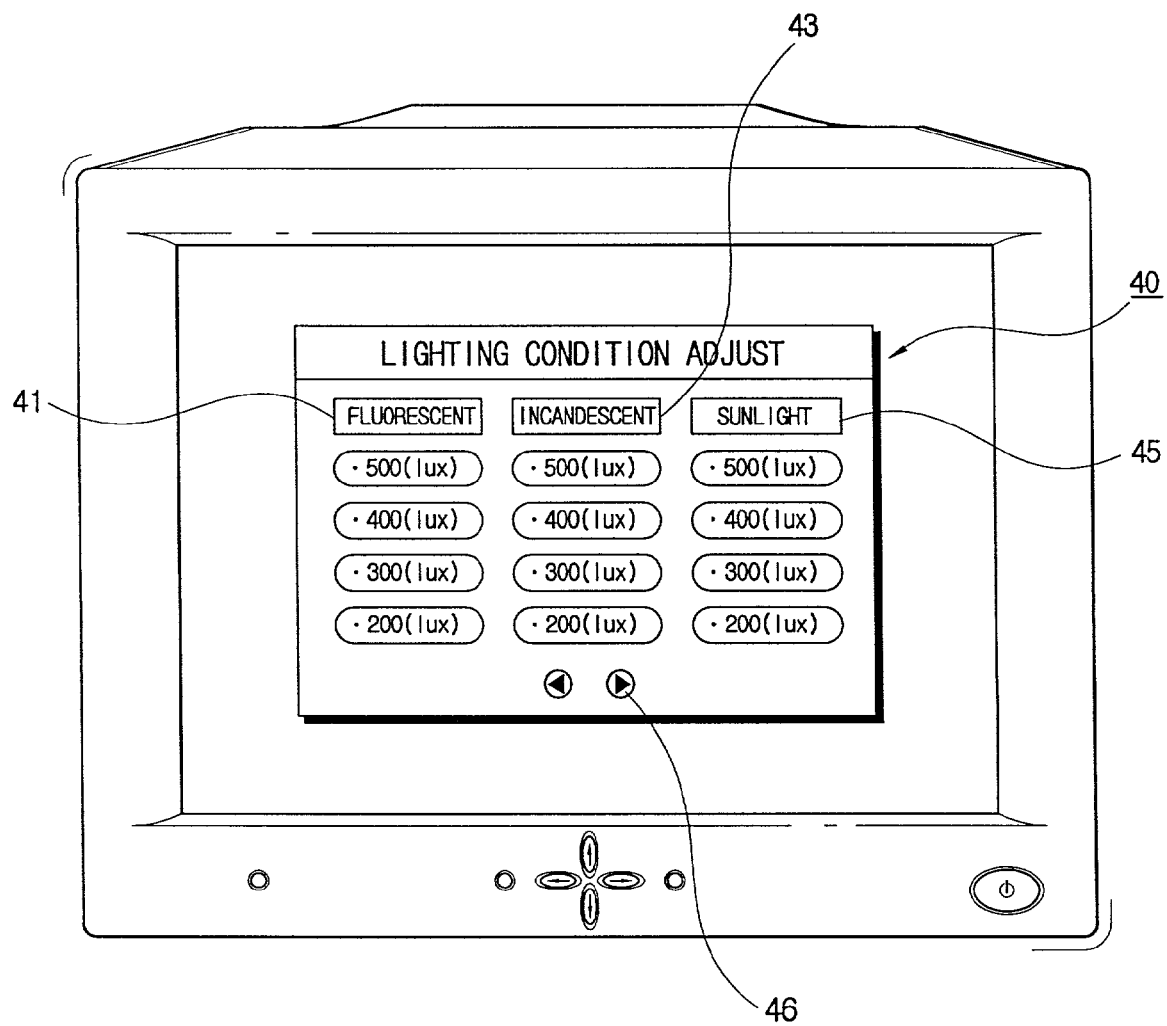
FIG. 7 shows a screen for setting up a lighting environment according to selection of the initial status set-up in FIG. 4.

FIG. 7 shows a lighting environment setting window 40 displayed after setting up the brightness adjustment at the time of selection of the initial status set-up 11a in FIG. 4. In order to select the lighting condition of a use environment of the monitor, there are provided an icon 41 for fluorescent light, an icon 43 for incandescent light and an icon 45 for sunlight. The fluorescent light icon 41, incandescent light icon 43 and sunlight icon 45 each have a respective plurality of icons as lower menus, to select the illuminance of the lights (200, 300, 400, 500 lux). Selection is made by use of scrolling buttons 46.

Figure 8:
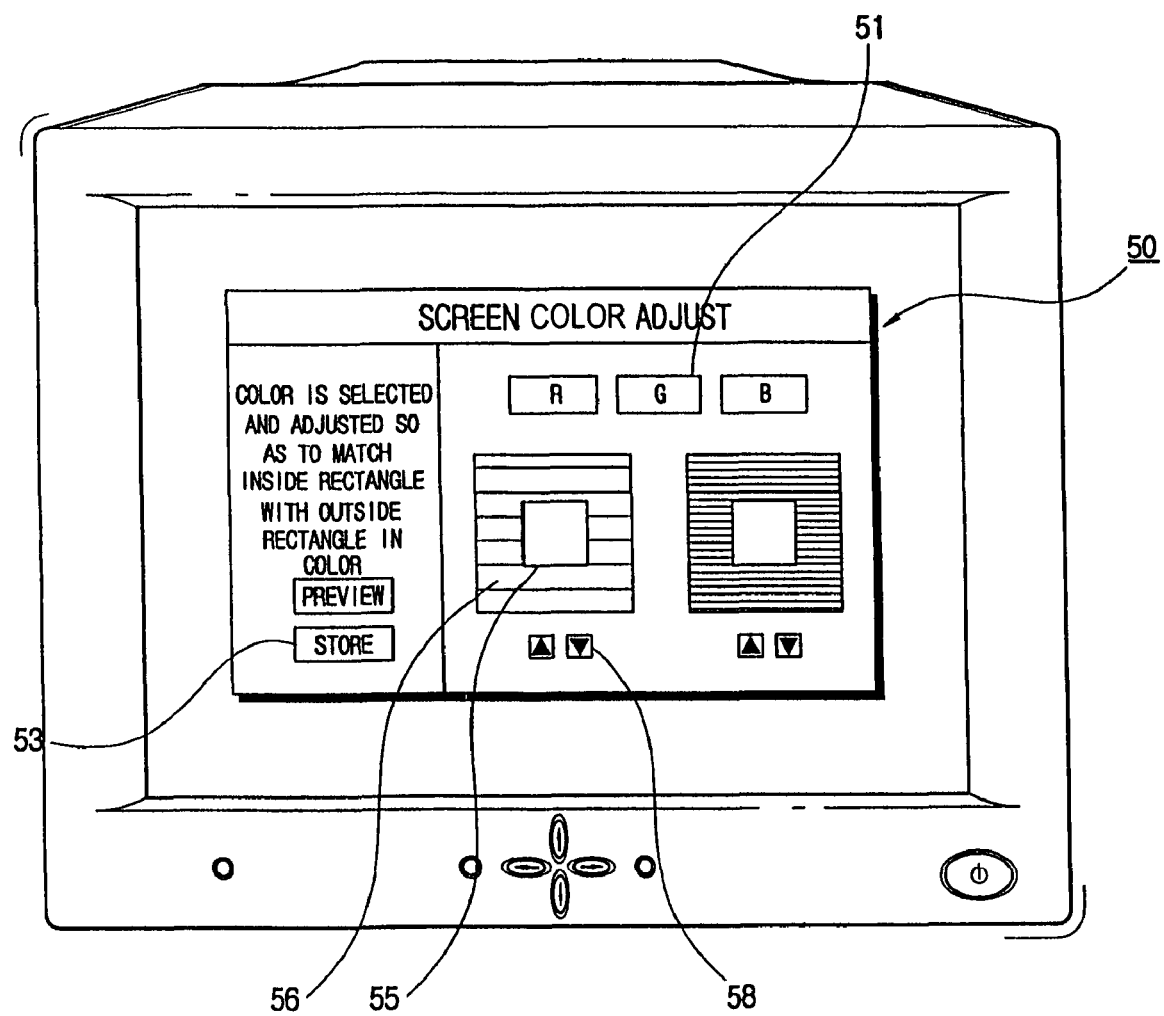
FIG. 8 shows a screen for color adjustment according to selection of screen color adjustment in FIG. 4.

FIG. 8 shows the color adjusting window 50 according to selection of screen color adjustment 11b in FIG. 4. The color adjusting window 50 is comprised of a plurality of color selecting icons 51 for selecting one of R, G and B colors and adjusting its color value, a color adjusting block including a color block 55 currently active in a reference color block 56 of the selected color and a color adjusting button 58 for adjusting the color value of the selected color. Here, if the color adjusting button 58 is adjusted, the color of the color block 55 becomes identical to the reference color block 56 provided outside the color block 55 because the color value of the color block 55 currently active has been increased or decreased. In this way, the color adjusting button 58 is selected so as to allow each color of R (red), G (green) and B (blue) to be matched with the reference color block 56, and when a store icon 53 is selected, then an ICM profile is generated and stored in memory.

FIG. 9 shows a window 60 for adjusting brightness of the printer when the brightness adjustment icon 13*c* is selected in FIG. 4, FIG. 10 shows a window 70 for adjusting colors of the printer when color adjustment icon 13*b* is selected in FIG. 4, FIG. 11 shows a window for outputting a sample image when the print sample image icon 13*a* is selected in FIG. 4. As explained earlier, the user first prints the sample image (see FIG. 11) to provide a printed reference image used when adjusting brightness and colors of the output by the printer, and then the user adjusts the brightness and the colors from the printer brightness adjusting window 60 and the printer color adjusting window 70 referring to the printed image.

The printer brightness adjusting window 60 shown in FIG. 9 is provided with an overall adjusting icon 64 for adjusting the brightness of the entire gray scale of a color value grade indicating bar 61 at one time, an individual adjusting icon 65 is provided for fine adjustment of the brightness of each gray color block in each color value grade in the color value grade indicating bar 61 indicating the gray color of various luminosities gradually, and a slider bar 63 is used for adjusting the color value responsive to selection of the overall adjusting icon 64 or the individual adjusting icon 65. A window converting icon 68 is provided for switching from the current screen to a previous screen or a next screen. Selection of the next screen after brightness adjustment is completed converts the printer brightness adjusting window 60 into the printer color adjusting window 70.

When the overall adjusting icon 64 is selected, all the grades of brightness can be adjusted at one time. When the individual adjusting icon 65 is selected, each grade of color value can be selectively adjusted. Therefore, if the user desires to adjust each grade of color value selectively, the individual adjusting icon 65 is selected, a color value grade which does not match with the printed image is selected, using a mouse, in the color value grade indicating bar 61 and the brightness thereof is adjusted through the slider bar 63. Since the color value is adjusted in the printer color value adjusting window 60, it is possible to match the color value seen on the screen with the color value of the printed image.

The printer color adjusting window 70 shown in FIG. 10 is provided with a color selecting part 71 for selecting one of R (red), G (green), B (blue), C (cyan), M (Magenta) and Y (yellow), a color grade adjusting part 73 having an adjusting bar for adjusting a brightness grade of a selected color and a minute (fine) adjusting part 75 having R, G and B slider bars for minutely adjusting the colors of R (red), G (green), B (blue), C (cyan), M (magenta), Y (yellow).

The color of the printed image and that of the image on the monitor can be consistently adjusted by use of the color selected in the color adjusting window 70. A color desired by the user to be adjusted is selected in the color selecting part 71. The selected color is displayed in the color grade adjusting part 73 and the color is adjusted using the adjacent slider bar to achieve a color that is most similar to the color of the printed image. If necessary, the color can be further adjusted using the slider bars in the minute adjusting part 75. A store icon 77 is selected if the color adjust is completed, thereby generating and storing a printer profile.

Here, the color adjusting method in the above-described embodiment is realized as an application software. However, the color adjusting method according to the present invention is capable of adjusting a color directly in the monitor, with realization of a program controlled by a microcomputer provided in the displaying apparatus.

With this configuration, a color of an image output from a video card of a computer main body is adjusted to match with an actual image on a screen of the displaying apparatus. The color of the image displayed on the screen and that of a printed image output from a printer can be adjusted to be matched with each other. In addition to the printer, colors between other image indicating apparatuses such as a scanner, a digital camera, etc. can be adjusted to be matched.

As described above, according to the present invention, there is provided a color adjusting method of a displaying apparatus capable of adjusting so as to match a color of the image indicated on the screen with an actual color.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for adjusting a color of an image displayed on a liquid crystal display monitor having a screen on which a sample image is displayed, the method comprising:
    displaying a first sample image on the screen;
    setting a contrast of the liquid crystal display monitor and the first sample image to a minimum value;
    adjusting the contrast of the liquid crystal display monitor and the first sample image through a user's operation of the liquid crystal display monitor by using a reference image electronically displayed on the liquid crystal display monitor such that the reference image is matched with the first sample image;
    obtaining an adjusted contrast value of the sample image to determine a white point of the liquid crystal display monitor;
    adjusting the brightness and color of the liquid crystal display monitor to allow a brightness and color of the first sample image to match a brightness and color of the reference image electronically displayed on the liquid crystal display monitor;
    obtaining a black point of the monitor based on the determined white point; and
    adjusting colors based on the adjusted contrast by adjusting a gamma value.

2. The method as set forth in claim 1, further comprising:
    adjusting a viewing angle between the screen and a user.

3. The method as set forth in claim 1, further comprising:
    obtaining a color profile of the monitor, the color profile containing the black point and the white point of the monitor;
    storing the color profile as a first image color matching file;
    displaying a second sample image on the screen, the second sample image comprising a first area surrounded by a second area;
    selecting a first one of a blue, green or red color adjustment to adjust a gamma property of a color of the second sample image;

adjusting a color of the first area to match a color of the second area according to the first selected color; and repeating the selecting and adjusting for the remaining two colors.

4. The method as set forth in claim 3, further comprising creating and storing a new image color matching file by adding the property of gamma to the first image color matching file, the new image color matching file having stored therein the black point and the white point.

5. The method as set forth in claim 4, further comprising:

displaying a light condition setting window for selecting a light type neighboring the monitor, the light type being selectable from a displayed icon for fluorescent light, a displayed icon for incandescent light and a displayed icon for sunlight.

6. The method as set forth in claim 5, further comprising, after adjusting the brightness to allow a brightness of the first sample image to match a brightness of a reference image, and setting a black point of the monitor, storing information of the selected light type in the first image color matching file.

* * * * *